UNITED STATES PATENT OFFICE.

CHRISTIAN RAMPINI, DECEASED, BY WILLIAM E. WARLAND, ADMINISTRATOR, OF BROOKLYN, NEW YORK, ASSIGNOR TO BADISCHE ANILIN & SODA FABRIK, OF LUDWIGSHAFEN-ON-THE-RHINE, GERMANY.

PRODUCING AMINO-ANTHRAQUINONES AND DERIVATIVES THEREOF.

1,063,173.   Specification of Letters Patent.   Patented May 27, 1913.

No Drawing.   Application filed March 15, 1912. Serial No. 684,082.

*To all whom it may concern:*

Be it known that WILLIAM E. WARLAND, a citizen of the United States, residing at Brooklyn, in the county of Kings and State of New York, administrator of the estate of CHRISTIAN RAMPINI, deceased, late a subject of the King of Bavaria, believes that CHRISTIAN RAMPINI did invent new and useful Improvements in Producing Amino-Anthraquinones and Derivatives Thereof, of which the following is a specification.

A method of producing amino-anthraquinones is to heat the corresponding anthraquinone sulfonic acid with aqueous ammonia, so that the sulfonic acid group is replaced by the amino group. It has now been found that the reaction proceeds much more smoothly and that less by-products are produced if, during the reaction, an oxidizing agent, which does not attack the amino compound under the conditions existing during the process, be added to the reaction mixture. As instances of suitable oxidizing agents may be mentioned manganese peroxid, cuprous oxid, cupric oxid, a bichromate, arsenic oxid and silver oxid.

The following examples will serve to illustrate further the nature of this invention, which, however, is not limited to the examples given. The parts are by weight.

Example 1: Heat together, at 200° C., for 24 hours, in an autoclave provided with a stirrer, 40 parts of the sodium salt of anthraquinone-2.6-disulfonic acid, 250 parts of 25% ammonia solution and 78 parts of copper sulfate. Then re-crystallize the product, or extract it with dilute nitric acid, in order to remove the copper. The product consists of pure 2.6-diamino-anthraquinone. In a similar manner, 2.7-diamino-anthraquinone can be obtained from anthraquinone-2.7-disulfonic acid.

Example 2: Stir together, in an autoclave provided with a stirrer, 250 parts of the sodium salt of anthraquinone-beta-sulfonic acid (in the condition of a 50 per cent. paste), 156 parts of 80% manganese dioxid and 130 parts of water. Then add 580 parts of 25% ammonia and heat for 24 hours at 200° C. The beta-amino-anthraquinone produced can be separated from the manganese dioxid by treatment with sulfurous acid, or a bisulfite, and is then dried. It melts at about 300° C. and the yield is almost theoretical.

Example 3: Heat together for from 20 to 24 hours, at 200° C., in an autoclave provided with a stirrer, 250 parts of the sodium salt of anthraquinone-beta-sulfonic acid, 150 parts of sodium bichromate, 50 parts of ammonium chlorid, and 600 parts of 15% ammonia. The reaction product, after being freed from chromium oxid, is pure. In a similar manner, 1.5-diamino-anthraquinone and 1.8-diamino-anthraquinone can be obtained from the corresponding disulfonic acids, and other derivatives of anthraquinone, such for instance as the amino-anthraquinone-sulfonic acids can be treated in like manner. In any case, instead of the beta-anthraquinone-sulfonic acids, the corresponding alpha-anthraquinone compounds can be employed, and the alpha-amino-anthraquinones are obtained in such yield and of such purity as have not hitherto been obtained.

Now what is claimed is:—

1. The process of producing amino-anthraquinones by heating anthraquinone-sulfonic acids with aqueous ammonia in the presence of an oxidizing agent.

2. The process of producing 2-amino-anthraquinone by heating anthraquinone-2-sulfonic acid with aqueous ammonia in the presence of an oxidizing agent.

3. The process of producing 2-amino-anthraquinone by heating anthraquinone-2-sulfonic acid with aqueous ammonia in the presence of copper sulfate.

In testimony whereof I have hereunto set my hand in the presence of two subscribing witnesses.

WILLIAM E. WARLAND,
*As administrator of Christian Rampini, deceased.*

Witnesses:
  CHRIS. H. ALMSTAEDT,
  WILLIAM MILLER.